US012749158B2

(12) United States Patent
Huang et al.

(10) Patent No.: US 12,749,158 B2
(45) Date of Patent: Sep. 29, 2026

(54) APPARATUS AND METHOD FOR ENHANCING A WHITEBOARD IMAGE

(71) Applicant: CANON U.S.A., INC., Melville, NY (US)

(72) Inventors: Hung Khei Huang, Irvine, CA (US); Bradley Scott Denney, Irvine, CA (US)

(73) Assignee: Canon U.S.A., Inc., Melville, NY (US)

( * ) Notice: Subject to any disclaimer, the term of this patent is extended or adjusted under 35 U.S.C. 154(b) by 0 days.

(21) Appl. No.: 18/870,083

(22) PCT Filed: Jun. 2, 2023

(86) PCT No.: PCT/US2023/024311
§ 371 (c)(1),
(2) Date: Nov. 27, 2024

(87) PCT Pub. No.: WO2023/235581
PCT Pub. Date: Dec. 7, 2023

(65) Prior Publication Data
US 2025/0322496 A1 Oct. 16, 2025

Related U.S. Application Data

(63) Continuation of application No. PCT/US2022/081936, filed on Dec. 19, 2022.
(Continued)

(51) Int. Cl.
*G06T 5/50* (2006.01)
*G06T 5/20* (2006.01)
(Continued)

(52) U.S. Cl.
CPC .................. *G06T 5/50* (2013.01); *G06T 5/20* (2013.01); *G06T 5/70* (2024.01); *G06T 7/11* (2017.01);
(Continued)

(58) Field of Classification Search
CPC ..... G06T 5/50; G06T 7/11; G06T 5/70; G06T 5/20; G06T 2207/10016; G06T 2207/20216; G11B 27/031
(Continued)

(56) References Cited

U.S. PATENT DOCUMENTS 10,122,969 B1 * 11/2018 Lim ....................... H04N 7/147
2010/0245563 A1 9/2010 Golovchinsky et al.
(Continued)

*Primary Examiner* — Thai Q Tran
*Assistant Examiner* — Nienru Yang
(74) *Attorney, Agent, or Firm* — Canon U.S.A., Inc., IP Division

(57) ABSTRACT

An image processing apparatus is provided and is configured to generate a second corrected image by using an average first corrected images, extracting one or more regions of the average first corrected images indicative of motion in the exacted image data; combining the extracted one or more regions with the first corrected image; generate a binary mask of the second corrected image, the binary mask having a region indicative of motion replaced using an average of a predetermined number of binary masks; generate a filtered image based on the binary mask of the second corrected image and the second corrected image; generate a third corrected image by performing second image correction processing on the filtered image; and perform blending processing that combines the third corrected image with the first corrected image to generate a final corrected image.

10 Claims, 13 Drawing Sheets

Related U.S. Application Data

(60) Provisional application No. 63/348,728, filed on Jun. 3, 2022, provisional application No. 63/291,650, filed on Dec. 20, 2021.

(51) Int. Cl.
*G06T 5/70* (2024.01)
*G06T 7/11* (2017.01)
*G11B 27/031* (2006.01)

(52) U.S. Cl.
CPC .. *G11B 27/031* (2013.01); *G06T 2207/10016* (2013.01); *G06T 2207/20216* (2013.01)

(58) Field of Classification Search
USPC .......................................................... 386/264
See application file for complete search history.

(56) References Cited

U.S. PATENT DOCUMENTS

| | | | | |
|---|---|---|---|---|
| 2017/0115855 | A1 | 4/2017 | Farouki | |
| 2017/0177931 | A1 | 6/2017 | Fang | |
| 2017/0372449 | A1* | 12/2017 | Yarvis | H04N 5/265 |
| 2019/0325253 | A1 | 10/2019 | Eikenes et al. | |
| 2021/0019892 | A1* | 1/2021 | Zhou | G06T 7/155 |

* cited by examiner

```
/* Calculates coefficients of perspective transformation
 * which maps (xi,yi) to (ui,vi), (i=1,2,3,4):
 *
 *      c00*xi + c01*yi + c02
 * ui = ---------------------
 *      c20*xi + c21*yi + c22
 *
 *      c10*xi + c11*yi + c12
 * vi = ---------------------
 *      c20*xi + c21*yi + c22
 *
 * Coefficients are calculated by solving linear system:
 * / x0 y0  1  0  0  0 -x0*u0 -y0*u0 \ /c00\ /u0\
 * | x1 y1  1  0  0  0 -x1*u1 -y1*u1 | |c01| |u1|
 * | x2 y2  1  0  0  0 -x2*u2 -y2*u2 | |c02| |u2|
 * | x3 y3  1  0  0  0 -x3*u3 -y3*u3 |.|c10|=|u3|,
 * |  0  0  0 x0 y0  1 -x0*v0 -y0*v0 | |c11| |v0|
 * |  0  0  0 x1 y1  1 -x1*v1 -y1*v1 | |c12| |v1|
 * |  0  0  0 x2 y2  1 -x2*v2 -y2*v2 | |c20| |v2|
 * \  0  0  0 x3 y3  1 -x3*v3 -y3*v3 / \c21/ \v3/
 *
 * where:
 *   cij - matrix coefficients, c22 = 1
 */
```

Figure 5

APPARATUS AND METHOD FOR ENHANCING A WHITEBOARD IMAGE

CROSS-REFERENCE TO RELATED APPLICATIONS

This application is a National Phase Application of International Patent Application PCT/US2023/024311 filed on Jun. 2, 2023 which claims priority from U.S. Provisional Patent Application Ser. No. 63/348,728 filed on Jun. 3, 2022, and PCT Patent Application PCT/US2022/081936 filed on Dec. 19, 2022 which claims priority from U.S. Provisional Patent Application Ser. No. 63/291,650 filed on Dec. 20, 2021, all of which are incorporated herein by reference.

BACKGROUND

Field

The disclosure relates to image processing techniques.

Description of Related Art

In a meeting room or conference center, there are generally writing surfaces upon which meeting participants are able to write using writing instruments and which allow the participant to view information that one or more participants believe is important. One such writing surface is a whiteboard and participants are able to write on the whiteboard with, for example, erasable whiteboard markers. This is a valuable collaboration tool used by participants. When the participants are writing on the board, the individuals block an area of the whiteboard.

In certain instances, there is a need for people who are physically unable to be in the meeting room or conference center to be able to participate remotely. There are a plurality of remote online meeting solutions that can effectuate this process. Further, during these meetings where one or more participants are remotely located, it is desirable for them to be able to view what is being written on the writing surface to feel as though they are part of the collaboration. Tools such as electronic whiteboards which digitize written information exist to allow this to occur but they are expensive and difficult to integrate with IT networks. Other mechanism such as image capture systems also exist which allow for an image capture device to capture an image of the writing surface and transmit those images to the remote users. However, in a remote meeting scenario, where a single camera is used to display the meeting room, remote users usually have difficulty in viewing/reading the contents of a whiteboard shown by the single camera. Further drawbacks include portions of the whiteboard being by one or more persons being in front of the whiteboard when writing. A possible solution for the problem would be an addition of a dedicated camera that focus on the whiteboard, incurring in additional cost in the meeting room set up for remote meetings. Further problems present themselves when there are multiple persons in a single room and are walking around such that they partially block the whiteboard. While techniques exist for removing or otherwise making persons translucent such that the material written on the whiteboard are visible, there are drawback in making the image quality of the material on the whiteboard is of sufficient quality and can be presented to remote users in real-time. A system and method according to the present disclosure remedies the drawbacks identified above.

SUMMARY

In one embodiment, an image processing apparatus is provided and includes one or more processors and one or more memories storing instructions that, when executed, configures the one or more processors, to generate a second corrected image by using an average first corrected images, extracting one or more regions of the average first corrected images indicative of motion in the exacted image data; combining the extracted one or more regions with the first corrected image; generate a binary mask of the second corrected image, the binary mask having a region indicative of motion replaced using an average of a predetermined number of binary masks; generate a filtered image based on the binary mask of the second corrected image and the second corrected image; generate a third corrected image by performing second image correction processing on the filtered image; and perform blending processing that combines the third corrected image with the first corrected image to generate a final corrected image.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

FIG. 5 illustrates an algorithm executed as part of the image processing algorithm of FIGS. 3A-3G.

Figure 1:
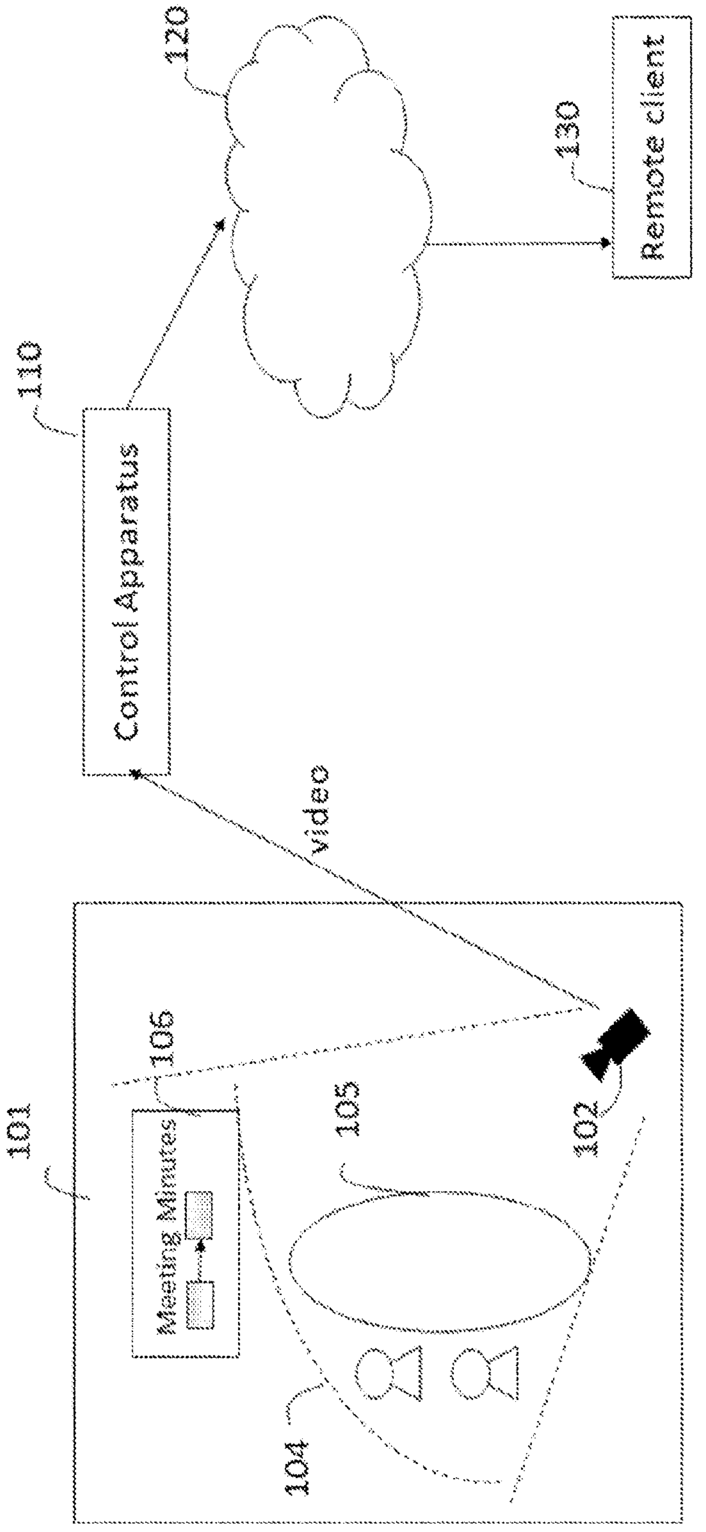
FIG. 1 illustrates the system architecture of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

In an online meeting environment where a writing surface such as a whiteboard is being utilized by one or more participants in a meeting room, it is important that those attending the meeting remotely, and thus online, are able to clearly visualize the information being written on the writing surface. This is particularly problematic when a person is making use of the writing surface and blocks a portion thereof. As such, it is desirable to both enhance the contents written on the writing surface but also remove, from the captured image, the user blocking the writing surface. One way this is accomplished is using an image capture system such as a camera that can capture high resolution video image data of the writing surface so that those images can be communicated via a network to the remote participants for display on a computing device such as a laptop, tablet, and/or phone. However, in an exemplary environment as shown in FIG. 1 below, where there is a single image capturing device configured to capture a wide view of the entire meeting room space, it may be particularly difficult to obtain an image of the writing surface that is sufficient quality for the remotely located meeting participants. Whiteboard images extracted from images captured by a camera that shows an entire room are very difficult to read due to noise, lighting effects and keystone issues. In order to improve the readability of whiteboards, captured in such an environment (without the addition of a dedicated camera for whiteboard), the below described system and method advantageously obtains high quality images of the writing surface which is extracted from a wide view of the meeting area for transmission to a remote user such that an enhanced image of the writing surface can be transmitted to the remote user using a separate data stream than a data stream that contains the full wide view of the meeting environment. In one embodiment, the transmission of the enhanced whiteboard image may occur via a different transmission channel than a channel that communicates the video images of the entire meeting area. Further improvements are provided by using motion mask processing in order to identify and compensate and remove objects (i.e. people) that are deemed in motion or recently in motion. This motion removal is provided as part of the correction processing described hereinafter.

FIG. 1 illustrates a system architecture according to an exemplary embodiment. The system according to the present disclosure is deployed in a meeting room 101. The meeting room 101 may be a conference room or the like. However, this is not limited to being in a single dedicated room. The system may be deployed in any defined area so long as the components shown in FIG. 1 are able to be included and operate as described below. The meeting room 101 includes a participant area 105 whereabout one or more participants can sit or otherwise congregate and engage in information exchange. As illustrated herein, the participant area includes a conference table and chairs occupied by two in-room meeting participants. This is shown for purposes of example only and the setup can be any type of setup that allows in-room participants to congregate and engage in information exchange. The meeting room 101 also includes a writing surface 106 upon which one or more participants present in the room are able to write information thereon for other participants to view. In one embodiment, the writing surface is a whiteboard that can accept writing using erasable markers. The system further includes an image capture device 102 (e.g. a camera configured to capture video image data or a series of still images in succession such that playback, of individual still images appear as if the image data is video image data) that is provided and positioned at a defined location within the meeting room such that the image data captured by the image capture device 102 represents a predefined field 104 (shown as the area between the hashed lines in FIG. 1.) of view of the room. In one embodiment, the predefined field of view includes the participant region 105 and the writing surface 106. The image capture device is configured to capture, in real time, video data of the meeting room by generating a full room view of everything within the predefined field of view 104. This real-time captured video data is referred to as the in-room data stream.

The image capture device 102 is controlled to capture the in-room data stream by a control apparatus 110. The control apparatus 110 is a computing device that may be located locally within the meeting room or deployed as a server that is in communication with the image capture device 102. The control apparatus 110 is hardware as described herein below with respect to FIG. 4. The control apparatus executes one or more sets of instructions stored in memory to perform the actions and operations described hereinbelow. In one embodiment, the control apparatus 110 is configured to control the image capture device 102 to capture the in-room video image data representing the field of view 104 in FIG. 1. This control is performed during a meeting occurring between the in-room participants and one or more remote participants that are connected and viewing the video data being captured by the image capture device 102. According the present disclosure, an algorithm for enhancing a predetermined region of the in-room video data that is being captured in real time is performed. This predetermined region to be enhanced includes the writing surface and areas therearound.

The control apparatus 110 is further configured to transmit video image data representing the real time in-room video via a communication network 120 to which at least one remote client using a computing device 130 is connected. In one embodiment, the communication network 120 is a wide area network (WAN) or local area network (LAN) that is further connected to a WAN such as the internet. The remote client device 130 can selectively access the in-room video data using a meeting application that controls an online meeting between participants in the room 101 and the at least one remote client device 130. The remote client device 130 may used a defined access link to obtain at least the in-room video data captured by the image capture device 102 via the control apparatus 110. In one embodiment, the access link enables the at least one remote client device 130 to obtain both the in-room video data and the predetermined region of the in-room video data that has been enhanced according to the image processing algorithm described hereinbelow.

In exemplary operation, the present disclosure advantageously enhances the writing surface 106 (e.g. whiteboard image) by selecting writing surface area on which a first image correction is performed to generate and store in memory, a first corrected image. In one embodiment, the first image correction is a keystone correction. Thereafter, a mask is computed based on the first corrected image and stored in a mask queue in memory which is set to store a predetermined number (which is configurable) of computed masks. When the Mask Queue is full, the oldest mask is dropped and new one is added to the end of the queue. A computed mask image that is used in performing the remaining image enhancement on the writing surface is computed based on all the masks in Mask Queue at a given time. The purpose of this process is to reduce the variation due to noise/compression across consecutive frames. Finally, the mask is applied to the first corrected image to filter out unwanted artifacts and generates a second corrected image on which color enhancement is applied thereby generating a third corrected image. This algorithm which is realized by one or more processors (CPU 501) of the control apparatus 103 reading and executing a pre-determined program stored in a memory (ROM 503) is described in greater detail below.

An exemplary image processing algorithm that improves the visual look of a predetermined region of a video data stream that is extracted therefrom and which performed by one or more processors that executes a set of stored instructions (e.g. a program) is described below. In one embodiment, the predetermined region includes a writing surface. The exemplary algorithm is as follows includes obtaining information representing predetermined corner positions of the writing surface to be corrected. These corner positions may be input via a user selection using a user interface whereby the user selects corner positions therein. In another embodiment, the writing surface (whiteboard, is automatically detected using known white board detection processing. For example, a user may view the in-room image that shows field of view 104 and identify points representing the four corners of the whiteboard. This may be done using an input device such as a mouse or via a touchscreen if the device displaying the video data is capable of receiving touch input.

Figure 2:
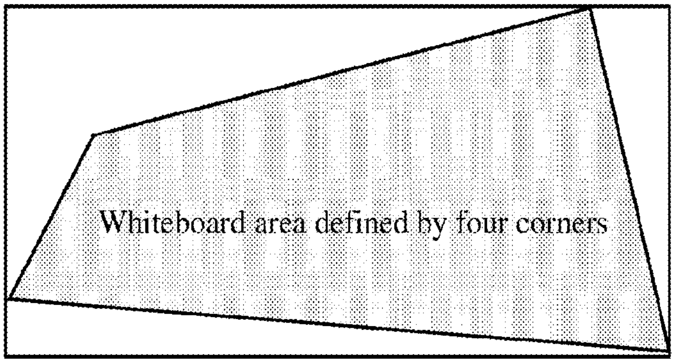
FIG. 2 illustrates a writing surface according to the present disclosure.

Thereafter, a first image correction processing is performed on the data extracted from the region identified above. The first image correction processing is keystone correction on the whiteboard area based on the 4 defined corners in order to compute the smallest rectangle that will contain the 4 corners as shown in FIG. 2.

The perspective transform is computed using the four user-defined corners as source and four corners of the computed rectangle as the target. The perspective transform calculates from four pairs of the corresponding points whereby the function calculates the 3×3 map_matrix of a perspective transform in Equation (1) so that:

$$\begin{pmatrix} t_i x_i' \\ t_i y_i' \\ t_i \end{pmatrix} = \text{map\_matrix} \cdot \begin{pmatrix} x_i \\ y_i \\ 1 \end{pmatrix} \quad (1)$$

where src represents the 4 corners defined and dst represents the 4 corners for the smallest rectangle according to the following equation $$dst(i) = (x_i', xy_i'),\ src(i) = (x_i, y_i),\ i = 1, 2, 3, 4 \quad (2)$$

The algorithm obtains coefficients of the map_matrix ($C_{ij}$) which is computed according to the algorithm illustrated in FIG. 5. Upon obtaining the map_matrix values, a perspective transformation is applied using the inverse of the map_matrix transform computed in the whiteboard source image to obtain the keystone corrected whiteboard image (KC Image). The perspective transformation transforms the source image using the specified matrix in equation 3:

$$dst(x, y) = src\left(\frac{C_{00}x + C_{01}y + C_{03}}{C_{20}x + Cy + C_{22}}, \frac{C_{10}x + C_{11}y + C_{12}}{Cx + C_{21}y + C_{22}}\right) \quad (3)$$

A further pre-processing step occurs to identify one or more areas in the image frame that contain motion and target those determined areas for removal prior to further enhancement of the whiteboard image. Accordingly, upon receipt of the KC image (FIG. 3B), the KC image is analyzed using a motion detection nodule. The motion detection module executes processing that performs background detection within the KC image to identify one or more areas in the KC image where motion is present. For example, if a person is standing in front of the writing surface and moving, there will be regions in each successive frame where the person is occluding the writing surface. As such, in order to enhance the whiteboard, the motion detection processing identifies regions where motion is present in order to extract that area and back fill with an average of image areas that did not contain motion. In exemplary operation, the motion detector determines that the difference in pixel values and generates a mask comprising the pixels surrounding the area(s) of motion. The motion mask is then used to remove motion pixels from the KC image. This process is illustrated in FIG. 6 which illustrates the algorithm for detecting and removing motion regions in a particular image frame.

Figure 6:
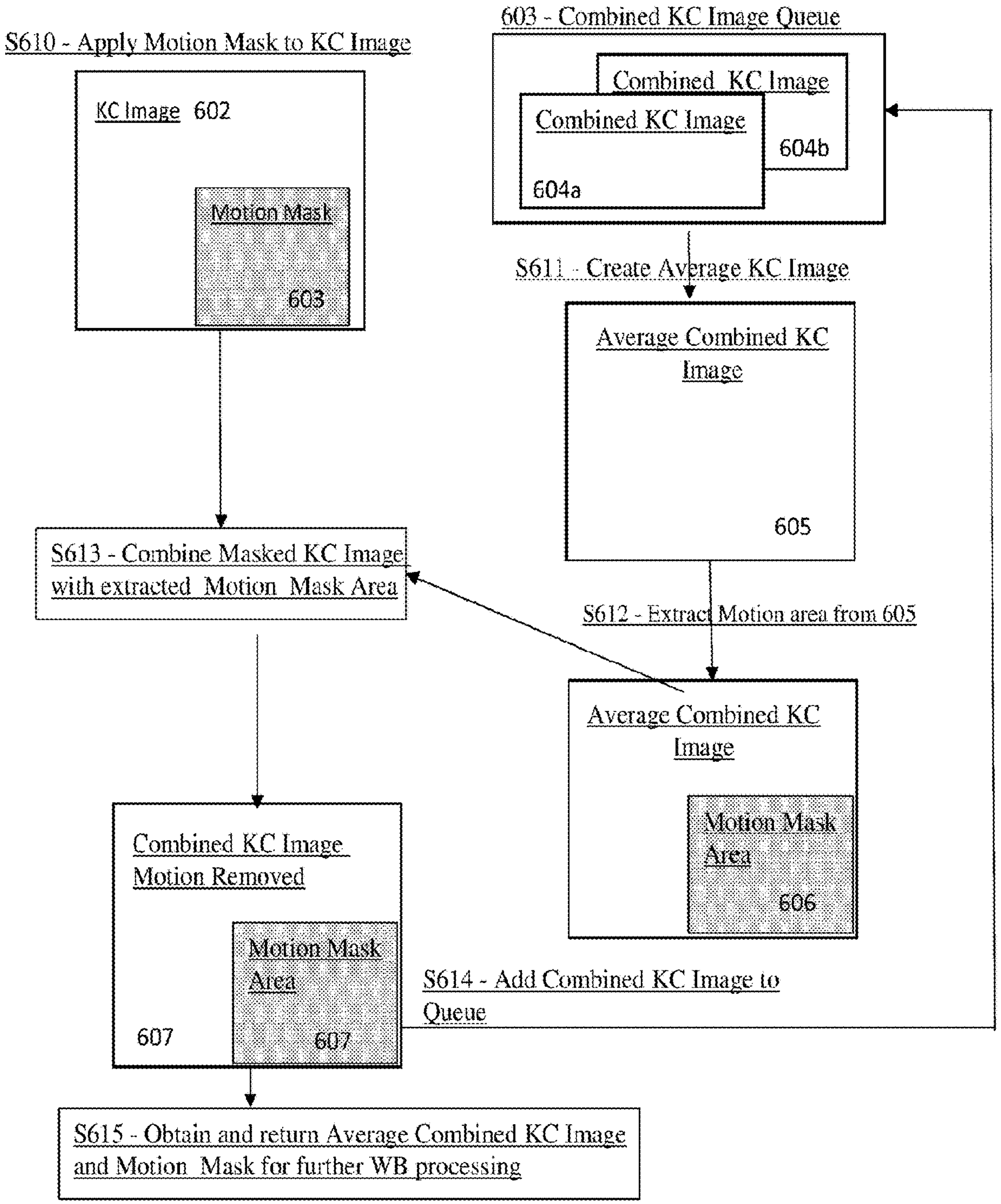
FIG. 6 is a flow diagram of an aspect of the image processing algorithm according to the present disclosure.

In FIG. 6, the processing performed is performed on per-frame basis and makes use of previously processed image frames for each successively enhanced writing surface image frame. Image frame 602 is provided, in step S610, as input to a motion detection module which performs motion detection to determine one or more regions of the image frame 602 that contains motion. Upon determining that motion is present in image frame 602, the region where motion is detected is processed and a mask of the region is generated as motion mask 603. This mask 603 represents pixel boundary definitions where motion is determined to be occurring in the given image frame 602. Simultaneously, as a current image frame 602 is provided as input in S610, a queue 603, in memory, that contains a predetermined number of previously corrected KC images 604*a*, 604*b* is averaged in step 611 to generate a average combined KC image 605. While the queue 603 illustrates two images 604*a* and 604*b*, it should be understood that this is for exemplary purposes only. In practice the queue 603 may include any number of previously corrected images constricted only by system requirements such as memory and/or a set value which has been previously set as a total number of previous frames to be stored in the queue 603. Using the combined averaged KC image 605, a region of the averaged combined KC image 605 that corresponds to the motion mask 603 is extracted in S612 and defined as a motion mask area 606. The data from the motion mask area 606 represents the writing surface that is not obscured by a user or otherwise exists without in front thereof. This advantageously allows for the area of the KC input image 602 with the motion mask 603 to be replaced to generate an updated combine KC image with motion region being removed. In S613, the data from the motion mask area 606 is provided and combined with the KC image 602 having the motion mask 603 that was input to the motion detector. The combined KC image 607 that has any motion removed therefrom is generated. Image 607 includes motion mask area data 606 extracted from the average combined KC images in the queue that has been combined with data from the KC image 602 outside of the motion mask 603. As such, the combination image 607 has removed motion for the particular frame and is then provided, in S614 to queue 603 and also for further processing in S615 where the obtained average combined KC image 607 and motion mask 603 are provided for binary mask filtering discussed below. The processing in FIG. 6 repeats then for the next subsequent frame.

A binary mask is then created to filter out noise/illumination artifacts where the threshold value is the mean of neighborhood area. The KC Image is converted to grayscale and adaptive thresholding is applied to the grayscale image to create the binary mask. Adaptive thresholding is a method where the threshold value is calculated for smaller regions and therefore, there will be different threshold values for different regions). In one embodiment, the threshold value is the mean of neighborhood area and pixel values that are above the threshold are set to 1 and pixels values below the threshold are set to 0 (for example, the neighborhood area is a block/neighborhood size of 21). The created mask is added to a queue of masks.

Figure 7:
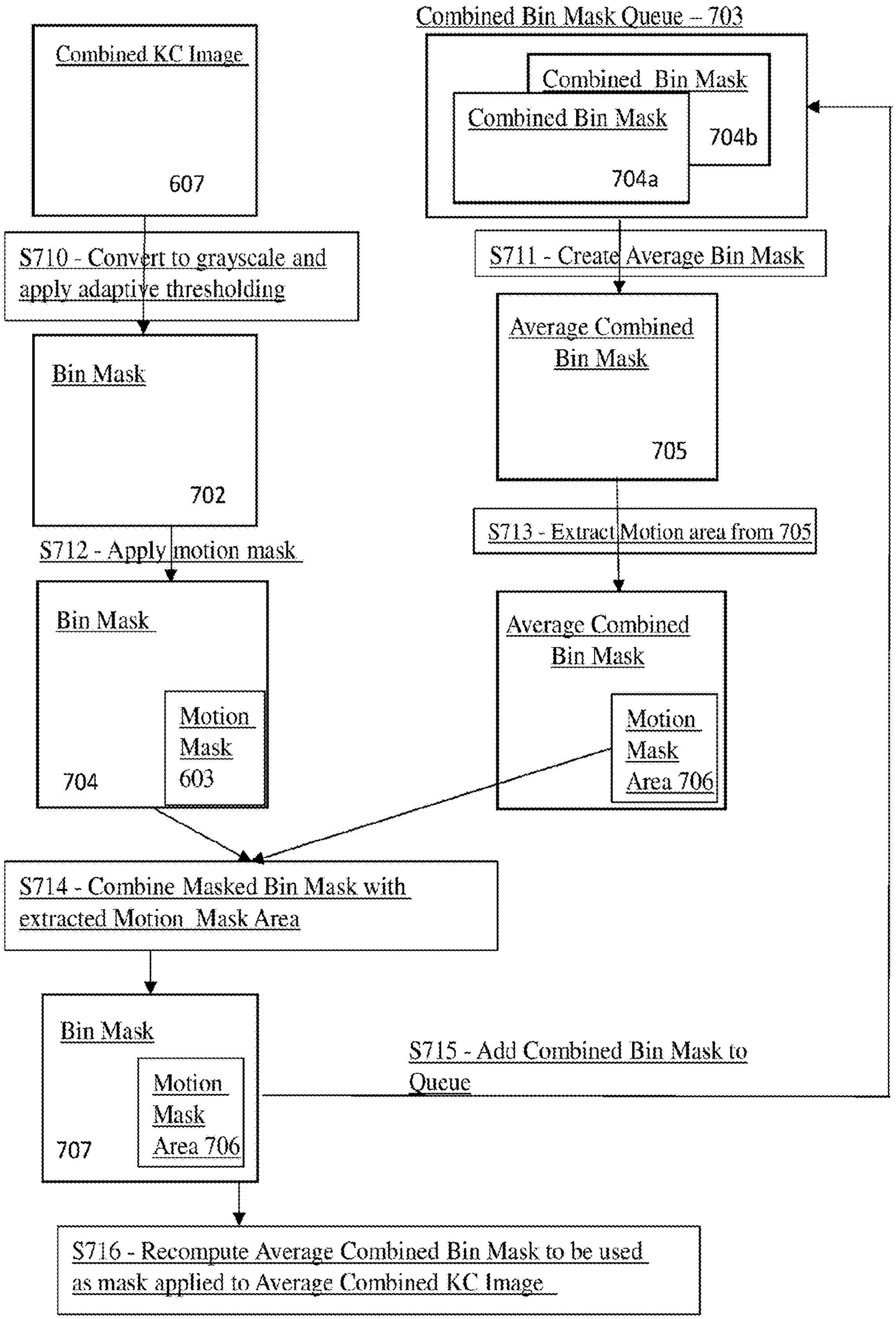
FIG. 7 is a flow diagram of an aspect of the image processing algorithm according to the present disclosure.

After the averaged KC image is obtained in FIG. 6 and the binary mask processing is performed as discussed above, the motion pixels are removed from the binary mask using the motion mask 603 generated in FIG. 6. This processing results in the creation of a combined binary mask, one based on the KC corrected image and one on the motion corrected KC corrected image. This processing is shown in FIG. 7.

Image 607 from FIG. 6 is input and, in S710 is converted to grayscale and subjected to adaptive threshold processing in the manner discussed above in order to generate a binary mask (bin mask) 702 that corresponds to image frame 607. The motion mask 603 is applied in S712 to the binary mask 702 to generate an updated binary mask 704 that identifies a region in the binary mask where motion has been detected. Simultaneously, as a current image frame 607 is provided as input, a mask queue 703, in memory, that contains a predetermined number of previously corrected binary masks 704*a*, 704*b* is averaged in step S711 to generate an average combined Binary mask 705. While the queue 703 illustrates two masks 704*a* and 704*b*, it should be understood that this is for exemplary purposes only. In practice the queue 703 may include any number of previous binary masks constricted only by system requirements such as memory and/or a set value which has been previously set as a total number of previous masks to be stored in the queue 703. Using the combined averaged binary 705, a region of the averaged combined binary mask 705 that corresponds to the motion mask 603 is extracted in S713 and defined as a motion mask area 706. The data from the motion mask area 706 represents the binary mask of writing surface that is not obscured by a user or otherwise exists without the user in front thereof. This advantageously allows for the area of the KC input image 607 with the motion mask 603 to be replaced to generate an updated combined binary mask with motion region being removed. In S714, the data from the motion mask area 706 is provided and combined with the Binary mask 704 having the motion mask 603 is combined to generate a binary mask 707 that has any motion removed. Image 707 includes binary motion mask area data 706 extracted from the average combined binary masks from the queue 703 that has been combined with data from the binary mask 704 outside of the motion mask 603. As such, the combination image 707 has removed motion for the binary mask for particular frame. It is then provided, in S715 to queue 703 and also for further processing in S716 where the obtained average combined binary mask 707 and motion mask 603 are provided for binary mask filtering of the KC image 607 from FIG. 6. The processing in FIG. 7 repeats then for the next subsequent frame.

Using the masks in the queue of masks, an updated binary mask (FIG. 3C) is created whereby, for each pixel in the updated binary mask, the pixel value is determined such that, if sum of values for that pixel in all the masks in queue is greater than or equal to the number of masks in queue divided 2, the pixel value in the updated mask is set to 1 (enabled). Otherwise the pixel value is set to 0. The calculation performed for each pixel in the updated mask is performed using Equation 4:

$$m_{xy} = \text{int}\left(\frac{\sum_{q=0}^{N} p_{xy}^{q}}{\text{int}\left(\frac{N}{2}\right)}\right) \tag{4}$$

where N is the number of masks in the queue, $$p_{xy}^{q}$$

is the value for a respective pixel (x,y) for mask q, that value being 0 or 1, and $m_{xy}$ is the value of the pixel (x,y) in the final mask.

Next, the saturation and intensity are adjusted based on user configuration to adjust for more or less color saturation/intensity. This adjustment is performed for each pixel in KC Image while applying updated binary mask. To do this, the image color space is converted from RGB to HSV in order to adjust saturation and intensity values. Once converted, for all pixels in HSV Image, if mask value for the pixel is 1 (enabled), the pixel S value is updated using the configured saturation setting and the pixel V value is with the configured intensity setting. On the other hand, if mask value in pixel in 0 (disabled), then the pixel is set to white HSV value (0,0,255). Once the settings for each pixel in the HSV image are applied, the HSV Image back to RBG color space as an updated RGB image. An alpha blend is applied the updated RGB image using the KC Image (background). The alpha value for blending is configurable which advantageously enables control as to how strong the unfiltered frame will be merged to the filtered frame. For example, if the alpha value was configured as 0, only the filtered frame will be visible whereas if the alpha value is configured as 1 only the unfiltered frame will be visible. This allows the user to configure the blending that will ultimately be performed. The following computation in Equation 5 is applied for each pixel in result image ($p^r$) using the updated RGB image ($p^u$) with the KC Image ($p^{kc}$) in order to return the resulting updated RGB image which has been filtered and adjusted.

$$p_{xy}^{r} = \alpha * p_{xy}^{u} + (1-\alpha) * p_{xy}^{kc} \tag{5}$$

As shown above, a processing for creating an averaged combined binary mask based on all of the masks in the combined mask queue and points are described above are performed using the averaged combined binary mask along with the average combined KC image. This will advantageously remove the pixel areas identified as motion areas and correct the image of the writing surface so that the writing can be adequately read and understood as described herein)

Figure 3A:
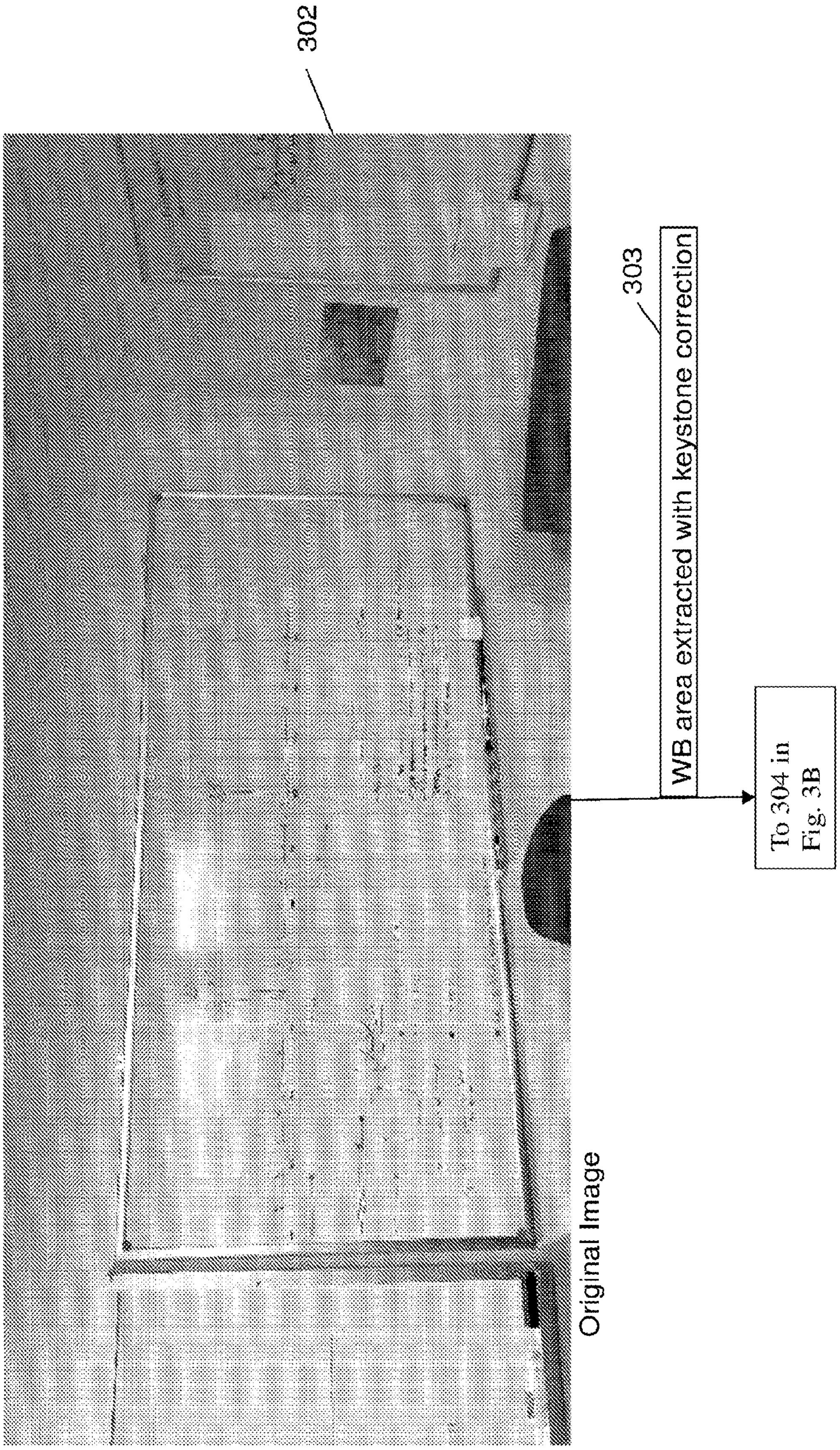
FIGS. 3A-3G illustrates an image processing algorithm according to the present disclosure.
Figure 3B:
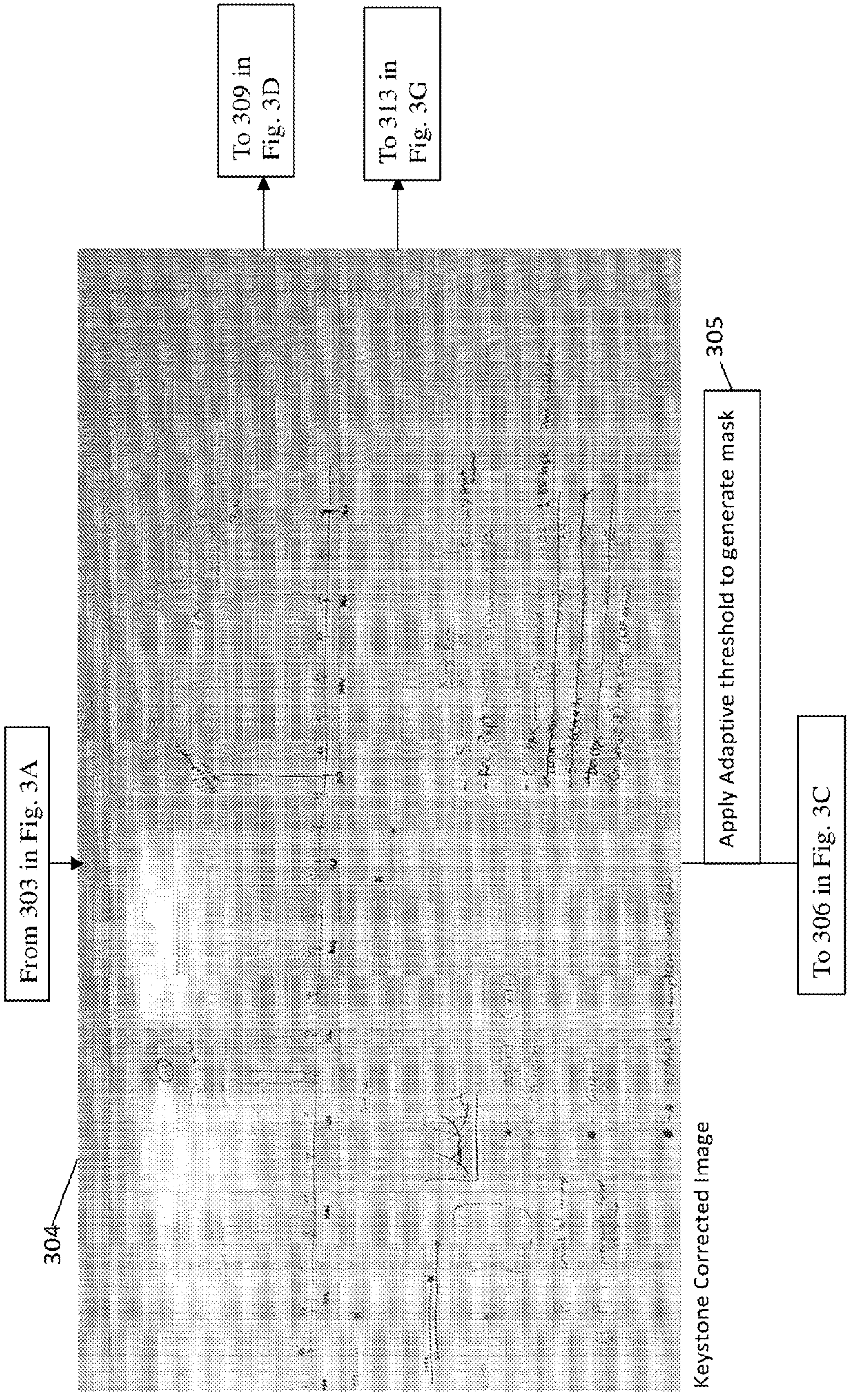
Figure 3C:
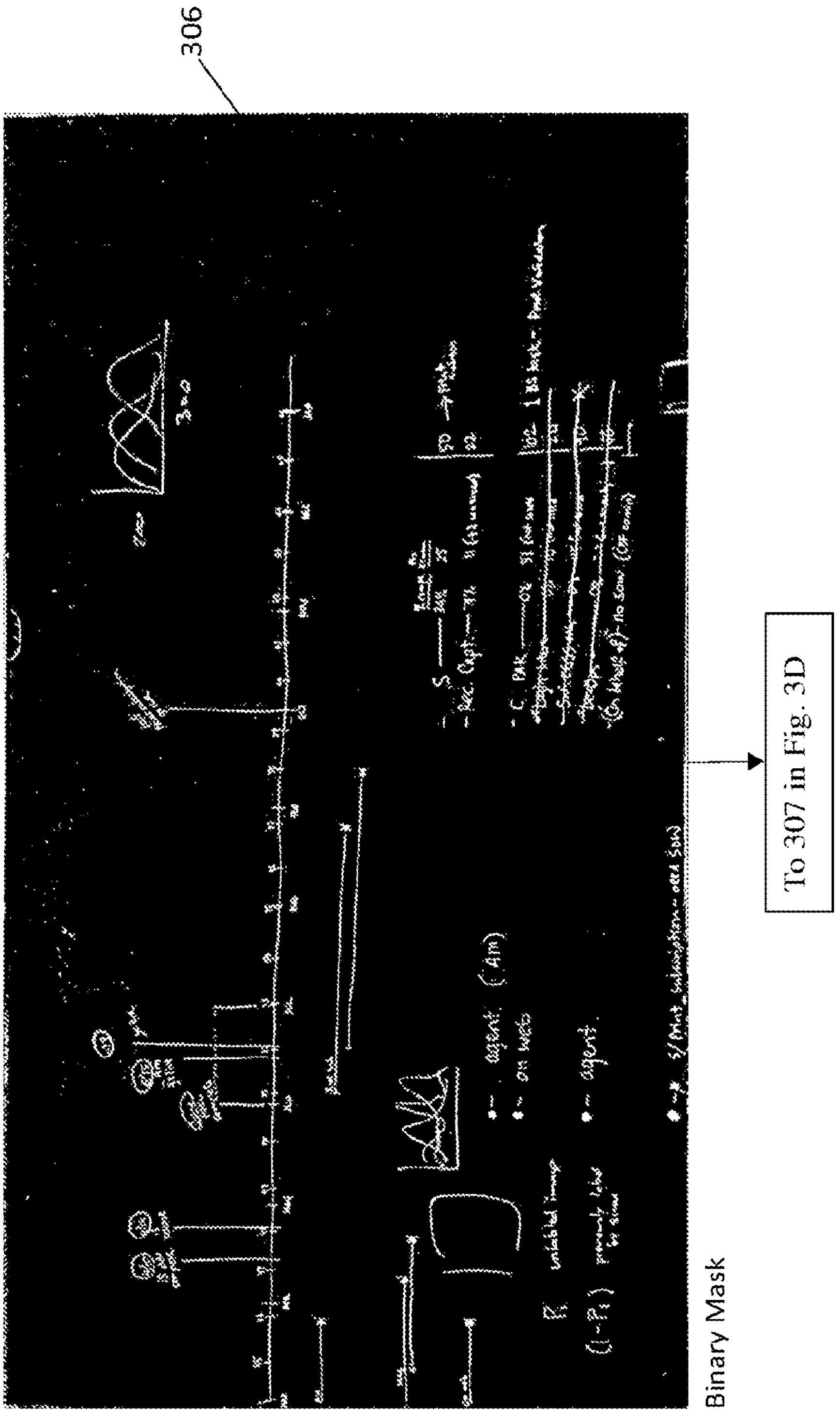
Figure 3D:
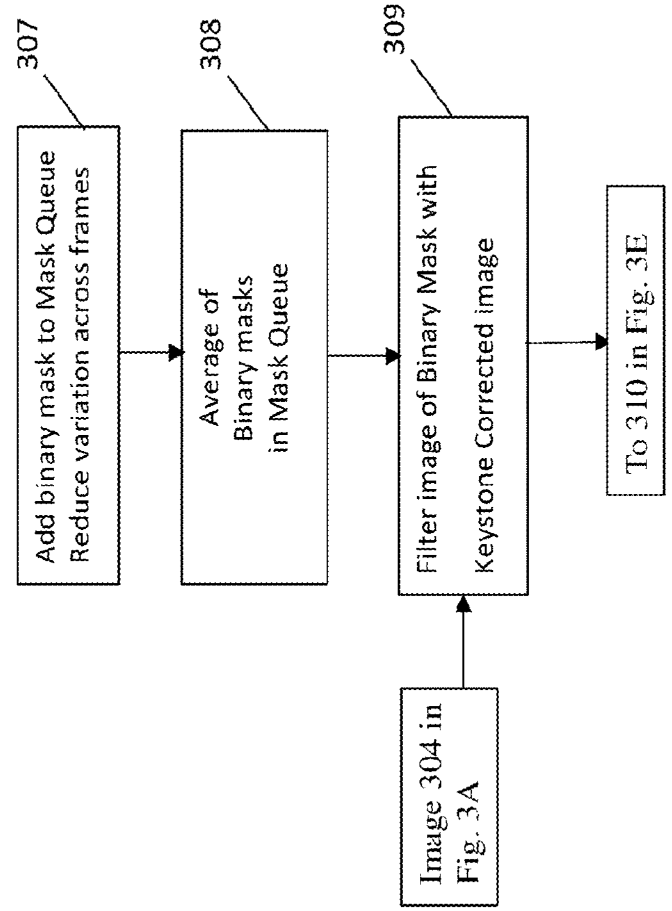

FIGS. 3A-3G is an illustrative flow diagram of the algorithm described above and will be described with respect to components in FIG. 1 that perform certain of the operations. The description and examples shown herein implement the algorithm described above. In 302, the control apparatus 110 causes video image data to be captured by the image capture device 102 that captures an image representing the field of view 104. While the whole field of view 104 is captured and includes the participant area 105 and the writing surface 106, image 302 in FIG. 3A depicts a region that surrounds the writing surface 106. As shown herein, the writing surface is identified based on four points that were selected by the user in advance and is based on the position of the camera. As such, the writing surface region is predefined and set for all instances that the image capture device is capturing the field of view 104 of meeting room 101. In other embodiments, a writing surface detection process can be performed thereby enabling the image capture device 102 to be moved about into different positions within the meeting room and the writing surface region may still be detected and processed as described below.

In 303, the writing surface region is extracted from image 302. The extracted writing surface region is defined using the points identified in image 302 whereby the points are positioned at respective corners of the writing surface. First image correction processing 303 is performed on the extracted writing surface region and generates a first corrected image 304 in FIG. 3B. In one embodiment, the first correction processing is a keystone correction process that generates a clear rectangular image. The first corrected image 304 in FIG. 3B is stored in memory and used as follows. A copy of the first corrected image 304 undergoes mask processing in 305 which applies adaptive thresholding techniques to generate a binary mask image 306 shown in FIG. 3C. Because the image processed described herein is performed using video data, additional image frames are provided as time continues and mask processing is performed on each extracted writing surface region in each frame. For each received image frame, a new mask 306 is generated and a series of generated masks is added to a mask queue in 307 in FIG. 3D. The mask queue represents a series of binary masks at individual points in time based on the video frame rate. The mask queue is set in advance so that a predetermined number of masks are stored therein so that these binary masks can be averaged and generate an average mask image in 308 in FIG. 3D. In 309, in FIG. 3D, the average mask image is filtered together with the first corrected 304 from FIG. 3A, a copy of which still remains in memory. The filtering in 309 generates a second corrected image 310 in FIG. 3E and is based on combining the first corrected image with the average mask image obtained from the mask queue.

Figure 3E:
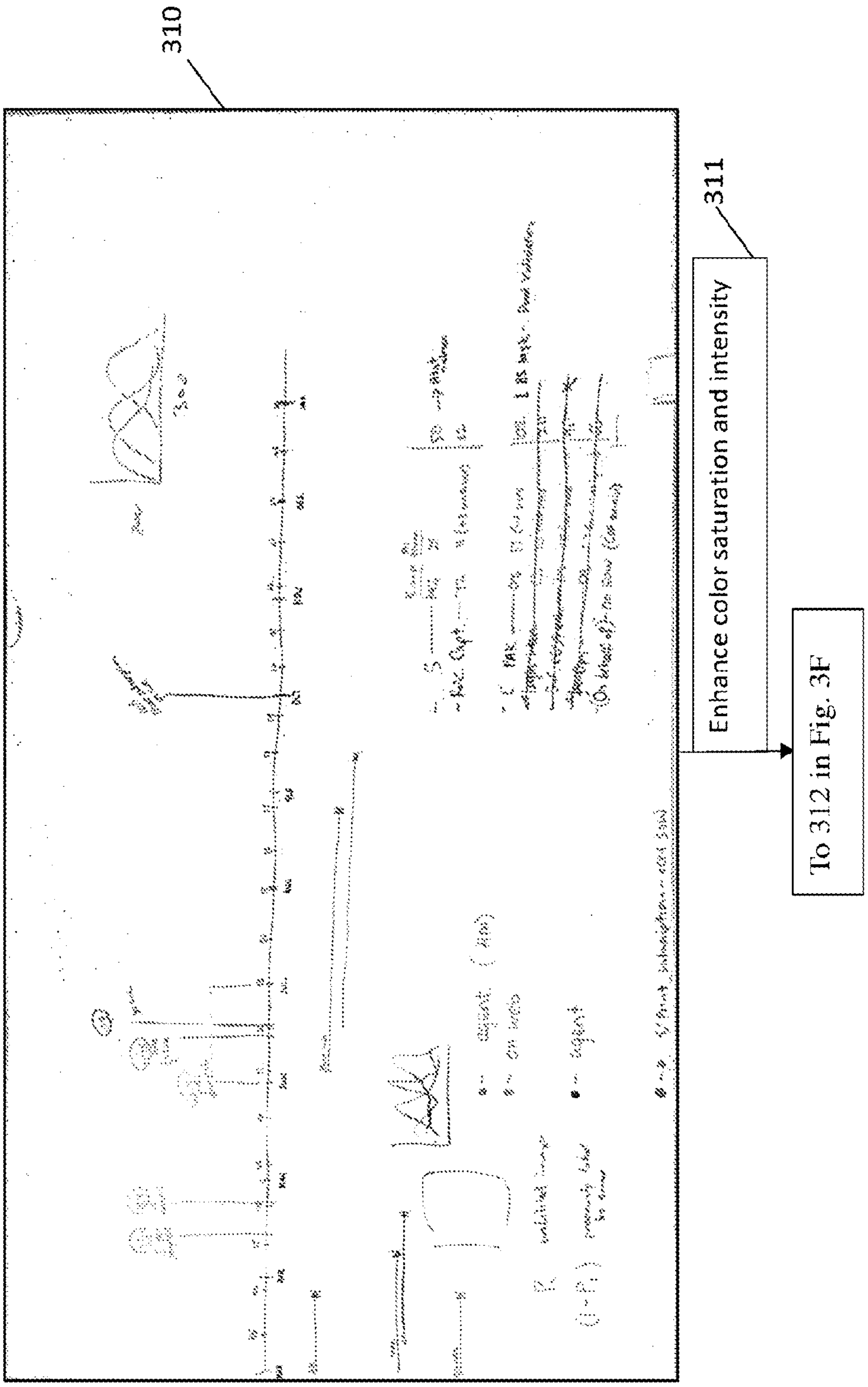
Figure 3F:
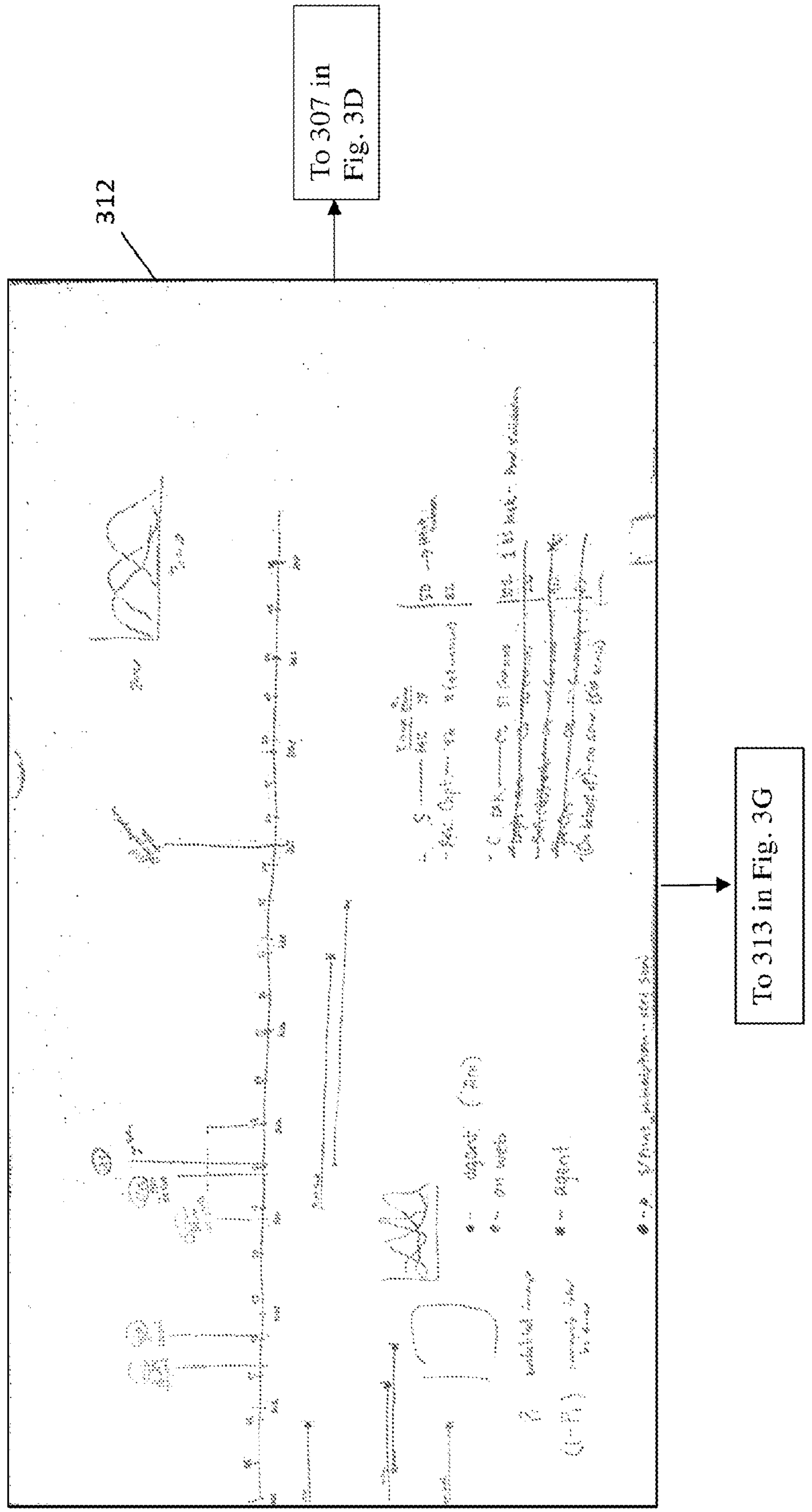
Figure 3G:
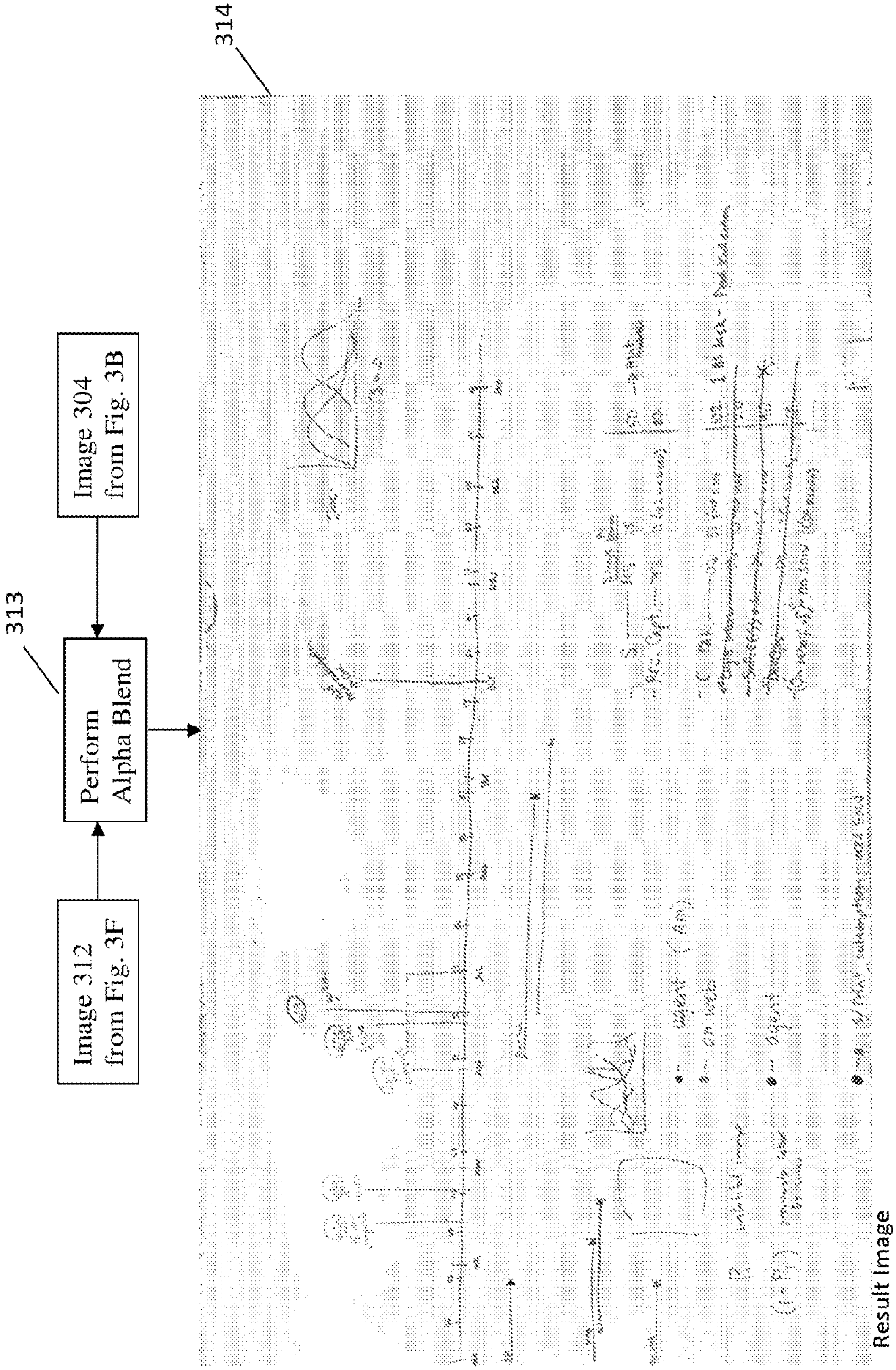

The second corrected image 310 in FIG. 3E undergoes second image correction processing in 311 that corrects color and intensity of the second corrected image 310. The result of the second image correction processing 311 generates a third corrected image 312 in FIG. 3F which has been keystone corrected and has been filtered to remove light glare and other artifacts from the original image 302. The third corrected image is provided to 313 in FIG. 3G which performs alpha blend processing using the third corrected image 312 and a copy of the first corrected image 304 from FIG. 3B which has been stored in memory. Alpha blend processing 313 causes a final corrected image 314 to be generated. The final corrected image 314 is then obtained by the control apparatus 110 and is transmitted via network 120 for receipt and display on the remote client computing device 130.

In operation, the above algorithm is performed in real time as new video image data representing the in-room video stream is received by the control apparatus 110. During the online meeting the in-room video stream is transmitted over a first communication path (e.g. channel) in a first format and caused to be displayed on a display of the remote computing device. The extracted region representing the writing surface is not transmitted in the same first format. Rather, as the above algorithm extracts data from video frames, the enhanced writing surface region is transmitted in a second format. In one example, the second format is still image data transmitted at particular rate so that the transmitted enhanced writing surface region appears as video but is actually a series of sequentially processed still images which are communicated to the remote client device over a second, different communication path (channel). This advantageously enables the control apparatus to cause simultaneous display of both the live video data captured by the image capture device and an enhanced region that is generated in accordance with the algorithm described herein of that video data. The algorithm advantageously creates a binary mask based on the keystone corrected image (based on a number of past masks) to filter out noise and then performs saturation and intensity enhancements after applying the mask to the original image in order to alpha blend the keystone corrected image and enhanced image to produce final result.

The above processing described in FIGS. 3A-3G can be modified for the embodiment discussed above in order to compensate for and remove motion when motion is detected in the captured images. As noted above, instead just using a KC corrected image, when motion removal is needed, an average combined KC image is used and the mask used is the average combined binary mask.

Figure 4:
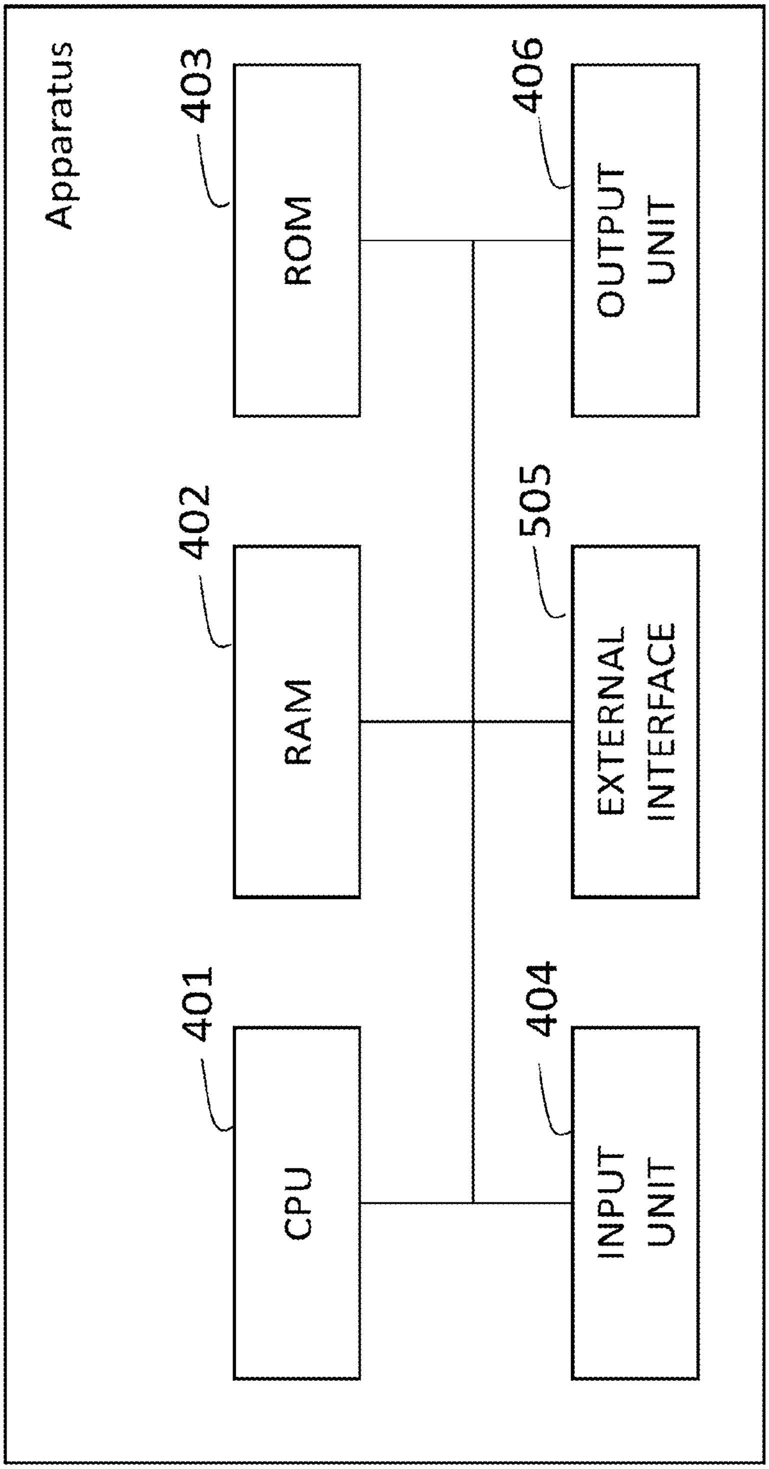
FIG. 4 illustrates the hardware configuration according to the present disclosure.

FIG. 4 illustrates the hardware that represents the control apparatus 110 that can be used in implementing the above described disclosure. The apparatus includes a CPU 401, a RAM 402, a ROM 403, an input unit, an external interface, and an output unit. The CPU 401 controls the apparatus by using a computer program (one or more series of stored instructions executable by the CPU 401) and data stored in the RAM 402 or ROM 403. Here, the apparatus may include one or more dedicated hardware or a graphics processing unit (GPU), which is different from the CPU 401, and the GPU or the dedicated hardware may perform a part of the processes by the CPU 401. As an example of the dedicated hardware, there are an application specific integrated circuit (ASIC), a field-programmable gate array (FPGA), and a digital signal processor (DSP), and the like. The RAM 402 temporarily stores the computer program or data read from the ROM 403, data supplied from outside via the external interface, and the like. The ROM 403 stores the computer program and data which do not need to be modified and which can control the base operation of the apparatus. The input unit is composed of, for example, a joystick, a jog dial, a touch panel, a keyboard, a mouse, or the like, and receives user's operation, and inputs various instructions to the CPU 401. The external interface communicates with external device such as PC, smartphone, camera and the like. The communication with the external devices may be performed by wire using a local area network (LAN) cable, a serial digital interface (SDI) cable, WIFI connection or the like, or may be performed wirelessly via an antenna. The output unit is composed of, for example, a display unit such as a display and a sound output unit such as a speaker, and displays a graphical user interface (GUI) and outputs a guiding sound so that the user can operate the apparatus as needed.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magnetooptical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

The use of the terms "a" and "an" and "the" and similar referents in the context of this disclosure describing one or more aspects of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter disclosed herein and does not pose a limitation on the scope of any invention derived from the disclosure unless otherwise claimed. No language in the specification should be construed as indicating any non-claimed element as essential.

It will be appreciated that the instant disclosure can be incorporated in the form of a variety of embodiments, only a few of which are disclosed herein. Variations of those embodiments may become apparent to those of ordinary skill in the art upon reading the foregoing description. Accordingly, this disclosure and any invention derived therefrom includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A control apparatus that performs image processing, the control apparatus comprising:

one or more processors; and one or more memories storing instructions that, when executed, configures the one or more processors, to:

receive a captured video from a camera capturing a meeting room;

extract and store a predefined region of the video as extracted image data;

generate a first corrected image by performing first image correction processing on the extracted image data to filter out noise;

generate a second corrected image by using an average first corrected images stored in a first temporal queue including previously generated first corrected image and extracting one or more regions of the average first corrected images indicative of a current motion boundary in the exacted image data;

combining the extracted one or more regions with the first corrected image to generate the second corrected image by replacing one or more regions of the current motion boundary in the first corrected image with data from the extracted one or more regions;

generate a binary mask of the second corrected image, the binary mask having a region indicative of motion corresponding to the current motion boundary region replaced by an average of a predetermined number of binary masks stored in a second temporal queue of binary masks;

generate a filtered image based on the binary mask of the second corrected image and the second corrected image;

generate a third corrected image by performing second image correction processing on the filtered image; and perform alpha blending processing that combines the third corrected image with the first corrected image to generate a final corrected image.

2. The control apparatus according to claim 1, wherein execution of the instructions further configures the one or more processors to:

determine, from the first corrected image, one or more regions indicative of motion by comparing; and generating the motion mask corresponding the determined one more regions.

3. The control apparatus according to claim 1, wherein execution of the instructions further configures the one or more processors to:

generate an initial binary mask corresponding to the second corrected image;

apply the motion mask to the generated binary mask;

using an average of previously stored binary masks in the second temporal queue, extracting the one or more region of the average binary mask that corresponds to the applied motion mask;

generating an updated binary mask by combining the extracted one or more regions of the average binary mask with the initial binary mask by replacing the one or more regions in the binary mask corresponding to the motion mask with the extracted one or more regions.

4. The control apparatus according to claim 1, wherein the first image correction processing is keystone correction that generates a substantially rectangular image of the exacted predefined region.

5. The control apparatus according to claim 1, wherein the second image correction processing corrects color and intensity of the first corrected image.

6. An image processing method performed by a control apparatus, the method comprising:

receiving a captured video from a camera capturing a meeting room;

extracting and store a predefined region of the video as extracted image data;

generating a first corrected image by performing first image correction processing on the extracted image data to filter out noise;

generating a second corrected image by using an average first corrected images stored in a first temporal queue including previously generated first corrected image and extracting one or more regions of the average first corrected images indicative of a current motion boundary in the exacted image data;

combining the extracted one or more regions with the first corrected image to generate the second corrected image by replacing one or more regions of the current motion boundary in the first corrected image with data from the extracted one or more regions;

generating a binary mask of the second corrected image, the binary mask having a region indicative of motion corresponding to the current motion boundary region replaced by an average of a predetermined number of binary masks stored in a second temporal queue of binary masks;

generating a filtered image based on the binary mask of the second corrected image and the second corrected image;

generating a third corrected image by performing second image correction processing on the filtered image; and performing alpha blending processing that combines the third corrected image with the first corrected image to generate a final corrected image.

7. The method according to claim 6, further comprising:

determining, from the first corrected image, one or more regions indicative of motion by comparing; and generating the motion mask corresponding the determined one more regions.

8. The method according to claim 6, further comprising:

generating an initial binary mask corresponding to the second corrected image;

applying the motion mask to the generated binary mask;

using an average of previously stored binary masks in the second temporal queue, extracting the one or more region of the average binary mask that corresponds to the applied motion mask;

generating an updated binary mask by combining the extracted one or more regions of the average binary mask with the initial binary mask by replacing the one or more regions in the binary mask corresponding to the motion mask with the extracted one or more regions.

9. The method according to claim 6, wherein the first image correction processing is keystone correction that generates a substantially rectangular image of the exacted predefined region.

10. The method according to claim 6, wherein the second image correction processing corrects color and intensity of the first corrected image.

* * * * *